2,946,755
RECOVERY OF DIATOMACEOUS EARTH

Charles A. Frankenhoff, 6 Hathaway Road, Scarsdale, N.Y.

No Drawing. Filed Oct. 3, 1956, Ser. No. 613,618

3 Claims. (Cl. 252—416)

This invention relates to diatomaceous earth and the method of recovering it in commercially useful condition from an intimate mixture with heat decomposable organic matter.

This application is a continuation-in-part of my co-pending application Serial No. 332,580, filed January 21, 1953, and now abandoned.

My product is particularly useful in connection with the recovery of diatomaceous earth filter aid in condition for reuse and, for that reason, the invention will be first illustrated in connection with such recovery.

It will be understood that filter aids are admixed in powder form with a turbid liquor to be filtered. During filtration, the filter aid collects continuously on the cloth or other filter support in mixture with the suspended matter originally present in the liquor. In so doing, the filter aid maintains the permeability of the resulting filter cake that may reach a thickness of a couple of inches. In the moment of passing through the filter cake, the liquor is strained from undissolved material, so as to become a clear filtrate. Decolorizing materials, on the other hand, remove dissolved coloring material from the liquor. In the use of bone char in sugar refining, for example, sugar liquor, after clarification by filtration with diatomaceous filter aid, is percolated for many hours, usually 3 or more, through a bed of granules of bone char to adsorb dissolved coloring material, the depth of the bed being great, suitably 20–50 feet.

Attempts to make filter aid from mixtures of diatomaceous earth with organic matter have been numerous and some of them have been at least moderately successful. In the United States, there has been proposed a process involving drying the diatomaceous earth filter cakes from filtration of sugar refinery liquors and the like, milling the dried product, and then heating the milled material to high temperature to cause oxidation of the organic matter and sintering of the diatomaceous earth.

I have now discovered that a superior product may be obtained by a process which omits this intermediate milling and also discontinues the final heating and oxidation step at a temperature substantially below that which was formerly considered necessary in this art.

Briefly stated, my invention comprises carbonizing organic matter in the diatomaceous earth material at a relatively low temperature, continuing the heating at this relatively low temperature until carbonization is substantially completed, and then admitting air and raising the temperature to that at which the carbonized organic matter is burned away, the maximum temperature of the air above the charge in the furnace, at all stages of the heating, being below that of hard sintering of the diatomaceous earth. I thus avoid forming lumps so hard as to require such severe milling as would fracture the diatoms excessively.

Proceeding as described in general above and more specifically hereinafter, I make a diatomaceous earth product that, when used as filter aid, has a high filtration rate and that, in most cases, is actually somewhat higher than the flow rate of the original diatomaceous earth in the composition, the comparison with the original diatomaceous earth being made particularly readily when the composition processed is a filter cake containing diatomaceous earth filter aid of kind for which the filtration rate is known.

As to materials, the mixture of diatomaceous earth and heat decomposable organic matter with which I start is ordinarily wet and in lump form. Thus it may be a filter cake made with diatomaceous earth as the filter aid in the filtration of raw sugar liquor, liquors encountered in the manufacture of antibiotics such as the various mycins, and paper mill white water.

Also the wet lumps may be those of a naturally occurring crude diatomaceous earth high in organic matter such as found in either bogs or lake bottoms. In any case, the composition of diatomaceous earth and the heat decomposable, that is, carbonizable organic matter, should not contain less than 20% of the organic matter on the weight of the diatomaceous earth on the dry basis and the organic matter should be embedded partly at least between particles of diatomaceous earth or in surface irregularities thereof. The diatomaceous earth in the composition used may be the finely divided form of naturally occurring diatomaceous earth of acceptable quality except for the contamination by organic matter. This means ordinarily that the diatomaceous earth on the organic free basis should not contain appreciably more clay and like contaminating metal components than diatomaceous earth deposits that are now being operated commercially in the United States and whose diatomaceous earth, after processing, is usable without special efforts to separate the clay component.

When the composition to be processed for the recovery of diatomaceous earth is one arising from commercial filtrations using diatomaceous earth filter aid, the diatomaceous earth may be that which was supplied initially in the form of the diatomaceous earth rock after (1) drying and milling, (2) calcining in dried and powdered form at around 1800°–1900° F., or (3) calcining in like manner after the incorporation of 3%–5% of sodium chloride, sodium carbonate, sodium silicate, or like flux, to make the commercially important flux-calcined diatomaceous earth.

The invention will be illustrated in greater detail by description in connection with the following specific examples of the practice of it.

EXAMPLE 1

There is used as the starting material a filter cake made by mixing flux-calcined diatomaceous earth with the fermented liquor in the manufacture of an antibiotic (here streptomycin), filtering the resulting mixture, and washing the cake which collects on the filter, all in accordance with the usual technique in this industry.

The filter cake is removed from the filters in the form of wet lumps. It contains about 20% or more of organic matter on the dry basis, the organic matter including the heat decomposable organic matter suspended originally in liquor. Much of the organic matter is carbohydrate.

The cake so obtained is heated slowly, as over the course of 30 minutes or so, up to a temperature of 700° F. During this heating, air is admitted, so that the drying occurs. The temperature is then raised from 700° F. to 1100° F. under the condition of restricted access of air to the carbonaceous material, until the carbonization of it is complete. This completeness may be determined during the first runs under the selected conditions by noting the time when no more smoke appears or when the weight of a portion of the charge, when tested in a covered crucible, shows no substantial further loss in weight on continued heating at the selected temperature of carbonization.

After the organic matter is thus carbonized, air is admitted to the mass and the temperature is raised to that at which the carbonized material oxidizes in contact with air. A temperature around 1200° F.–1800° F. in the furnace chamber is suitable for this oxidation.

The oxidizing temperature and air access are maintained until the black color of the carbon is either completely or substantially eliminated.

After the final oxidation, the soft lumps which remain are milled lightly until they may be passed completely through a 60 mesh screen and for best results will show in a wet screening test only 3%–15% retained on 150 mesh. Material that, when carbonized by my process, burns white on oxidation gives at best a gray to dark product under similar conditions of oxidation when the heat treatment has been effected by rapid passage through the temperature of carbonization to oxidizing and calcining conditions.

The product is a high speed, effective filter aid. Because of the precarbonization of the organic matter, temperatures around 1200–1500° F. are adequate to burn out the carbon. Use of such relatively mild condition of oxidation removes the danger of over-sintering the mass to hard lumps requiring such severe milling as would fracture the diatoms. They remove also the need of drying and then milling before calcination. The particularly satisfactory results from keeping the maximum temperature at all times during the heating at a temperature below sintering of the clay or any other mineral component of the diatomaceous earth are contrary to previous experience in this art. Within the temperature ranges stated, I obtain lower content of water soluble materials at temperatures of 1300° F. or higher and best results in this regard at 1700°–1800° F. Higher temperatures are unnecessary.

EXAMPLE 2

The procedure of Example 1 is followed except that the filter cake used is one which is produced in filtration with either the dried and milled natural diatomaceous earth as the filter aid or diatomaceous earth calcined without a flux, instead of the flux-calcined earth in the filter cake of Example 1.

EXAMPLE 3

The procedure of Example 1 is followed except that the wet mixture of diatomaceous earth and organic matter used is a bog deposit of diatomaceous earth such as represented by a deposit under water in the State of Florida.

EXAMPLE 4

The procedure of Example 1 is followed except that the filter cake used is the wet, lumpy material from the filtration of raw sugar liquor with flux-calcined diatomaceous earth filter aid in the proportion of 0.4% on the dry weight of the raw sugar.

The temperature measurements in the above examples were made with a thermocouple exposed directly above the material being processed in the furnace. All the diatomaceous compositions, before processing, contained over 20% of heat decomposable organic matter on the dry basis.

The products made after being lightly milled and put through the screen were tested for filtration on a city water supply, the pressure of filtration used being the same in the test of my recovered product as with a standard commercial diatomaceous filter aid used for comparison with that product. When the filter cake used and the processing were as described in Example 1, with the final oxidation temperature 1700° F., the rate of flow with my recovered product was approximately 125% of that with the same type and amount of flux-calcined diatomaceous earth in fresh, unused condition.

When the product was made from a filter cake, in which the diatomaceous earth represented was the natural dried and milled material, as in Example 2, the flow rate was substantially higher than for fresh natural diatomaceous earth.

When the product was made from bog diatomaceous earth by burning out the carbon as described in Example 3, the product had a filtration rate approximately equal to that of diatomaceous earth of high quality calcined at about 1800° F. without the addition of a flux.

EXAMPLE 5

Effect of temperature of oxidation

Using the procedure of Example 1, with the filter cake from flux-calcined diatomaceous earth filtration of the fermented liquor in streptomycin manufacture I have determined the effect on the filtration rate of the temperature of oxidation subsequent to the carbonizing of the organic matter in the filter cake.

The filter cake in wet lump form was placed in open crucibles and first heated to approximately 700° F. until dried.

The dried lumps so formed and without any milling were then heated in covered crucibles to approximately 1100° F. Carbonization and smoking occurred. When the temperature was held at this level until the carbonization was completed, one crucible with its contents, although not a part of this invention, was removed for testing as a filter aid. The other crucibles were then uncovered so as to permit free access of air. These open crucibles and their content of precarbonized filter cake were then heated at various temperatures until the carbon from the precarbonized organic matter was substantially completely oxidized and the products in the several crucibles were white. At this stage the lumps were less firm than before the oxidation. This softening effect of the calcination step is contrary to experience in the industry of diatomaceous earth. The softness of the lumps produced by me permits milling by very gentle means and without objectionable fracturing of the diatom structure. I consider this softness to be due to the destruction, by precarbonization, of materials that otherwise would act as a binder during the early stages of the oxidation and thus initiate the sintering together of the particles of diatomaceous earth.

The lumps obtained at various temperatures of oxidation were cooled in air and brushed with the bristles of a small paint brush through a 60 mesh screen. The powder so formed was then used in the filtration of a city water supply. The rate of filtration is shown for the various products in the following table.

| Filter Cake Processed by— | Pressure of Filtration, lbs./sq. in. | Gals. Filtrate, sq./ft./min. |
| --- | --- | --- |
| Drying, then heating with restriction of air to 1,100° F. (for comparison) | 7.5 | 8 |
| Same plus heating with access of air to: | | |
| 1,300° F | 7.5 | 22 |
| 1,500° F | 4.7 | 25 |
| 1,700° F | 4.7 | 45 |
| 1,800° F | 4.7 | 36 |
| Fresh unused flux calcined diat. earth (for comparison) | 4.7 | 36 |

EXAMPLE 6

Decolorizer and filter

In a modification of the invention, to make a product useful for purposes other than filtration, the second heating step with access of air is omitted. In other words, the filter cake or the bog diatomaceous earth is dried and then carbonized without air as described in Example 1 and the heating discontinued.

This carbon-retaining, unoxidized material is subjected to selective oxidation by air or superheated steam. Steam is passed over and through the black material in a tube or other suitable type of furnace, the steam being at atmospheric or low pressure and very hot, as, for example, at 800°–1500° F., until the carbon is partly oxidized and porosity is increased. The oxidation is discontinued while the product is still black and before more than three-fourths by weight of the original carbon content has been oxidized away. The product is an active decolorizing material, of very high flow rate.

EXAMPLE 7

Pigmentary material

In connection with my work I have discovered that various pigmentary materials may be made by calcining diatomaceous earth with chlorides in contact with sources of metals. Thus, diatomaceous earth admixed with 3–10% of sodium chloride and calcined at 1800° F. or so in contact with Monel metal gives a light green powder suggestive of the color of nickel pigments. Finely divided iron, when used in contact with the mass of diatomaceous earth and salt being calcined, gives a brown pigment. Brass used in like manner gives a slight bronze tint to the resulting product. For making such pigments, the metals are used in elemental form. They must be metals that are reactive at temperatures of calcination with chlorine and hydrogen chloride and whose oxides and silicates are colored. The finely divided state of the metals that may be used is illustrated by powder, granules, filings, and gauze of metal, all of which expose relatively large surfaces for reaction.

It will be understood that it is intended to cover all changes and modifications of the examples of the invention herein chosen for the purpose of illustration which do not constitute departures from the spirit and scope of the invention.

I claim:

1. A process for the recovery of diatomaceous earth in condition for use as a filter aid from an intimate mixture of the diatomaceous earth and heat-carbonizable organic matter including a carbohydrate disposed between the particles of diatomaceous earth and in the proportion of at least 20% of the weight of the diatomaceous earth on the dry basis, which comprises heating the diatomaceous earth at a temperature within the range from about 700° to about 1100° F. while limiting available air, thereby effecting carbonization of the organic material without burning, then heating the diatomaceous earth at a temperature within the range from about 1200° to about 1800° F. below the sintering temperature of minerals contained therein in the presence of sufficient air to effect substantially complete oxidation of carbonized matter, and only then breaking up any lumps present.

2. A process in accordance with claim 1, wherein the diatomaceous earth is spent filter cake from the filtration of raw sugar liquor.

3. A process in accordance with claim 1 in which the diatomaceous earth is a calcined diatomaceous earth.

References Cited in the file of this patent

UNITED STATES PATENTS

| | | |
|---|---|---|
| 1,475,502 | Manning | Nov. 27, 1923 |
| 1,782,648 | Fisher | Nov. 25, 1930 |
| 2,299,258 | Simpson et al. | Oct. 20, 1942 |
| 2,357,332 | Kelly et al. | Sept. 5, 1944 |
| 2,416,214 | Payne | Feb. 18, 1947 |
| 2,461,838 | Newhart | Feb. 15, 1949 |
| 2,616,858 | Gillette et al. | Nov. 4, 1952 |

OTHER REFERENCES

Calvert's "Diatomaceous Earth," New York, 1930.